Patented July 28, 1931

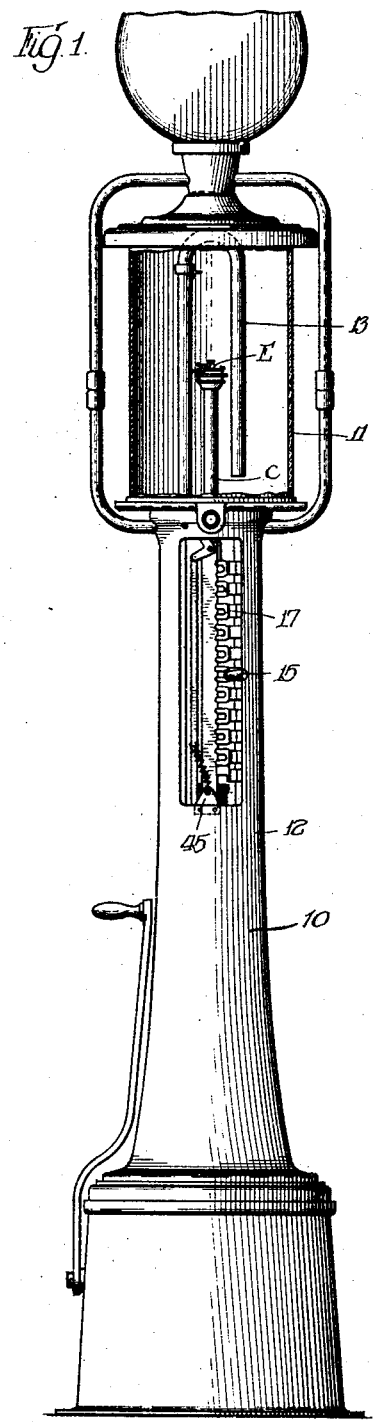
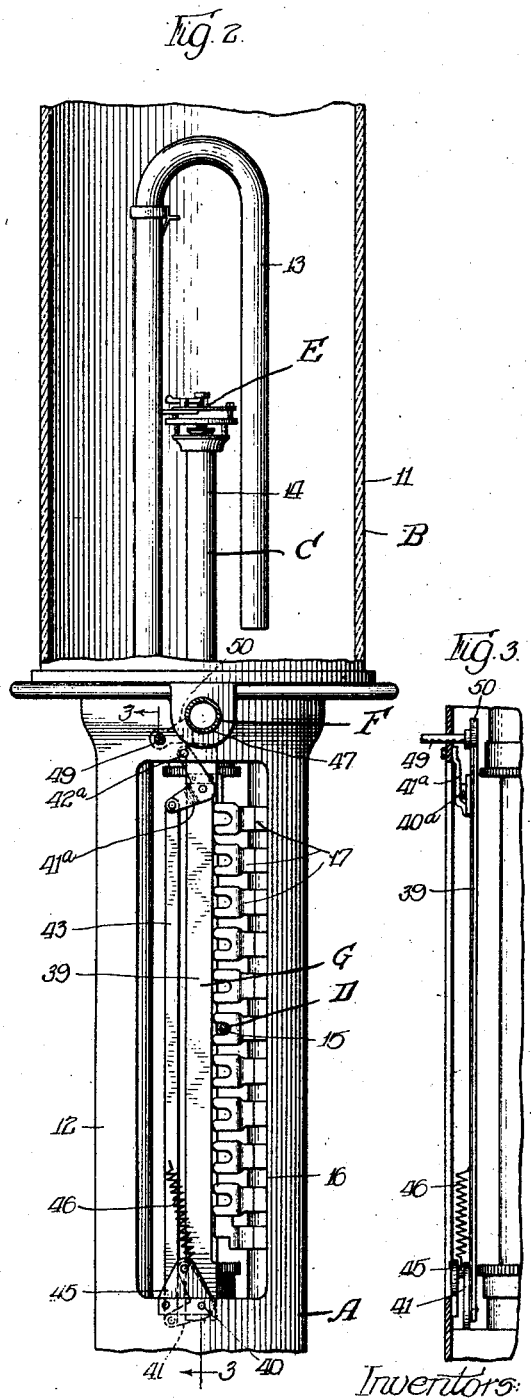

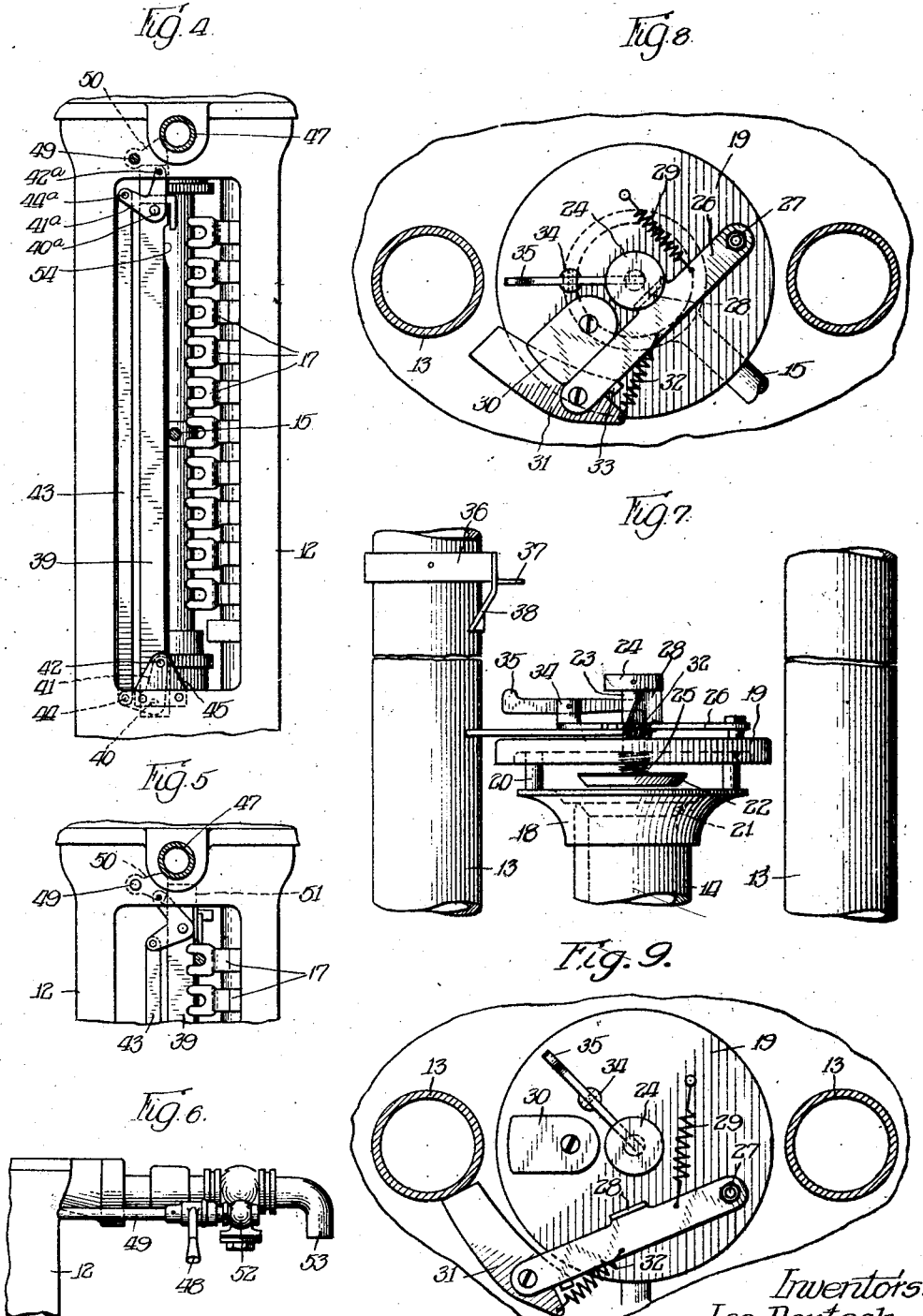

1,816,569

UNITED STATES PATENT OFFICE

LEO DEUTSCH, OF BEAVER, AND GEORGE J. GENUNG, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

FLUID DISPENSING APPARATUS

Application filed July 18, 1927. Serial No. 206,573.

The invention pertains to a fluid dispensing apparatus, and more particularly to discharge control means for a fluid pump whereby the fluid to be dispensed can only be discharged from said pump when said control means is in a predetermined position.

It is an object of this invention to provide a fluid dispensing apparatus whereby fluid may be brought to a predetermined level but cannot be discharged from said apparatus until the leveling control is moved to a predetermined position.

Another object is to provide mechanism cooperating with the leveling means and the discharge valve of a pump so that said discharge valve cannot be accidentally moved to open position, neither can said leveling mechanism be moved to predetermined or accidental unauthorized position.

Still another object is to provide a valve for an overflow pipe of a dispensing pump which may be opened to level fluid in the container of a pump but which is closed as soon as there is any movement imparted to said pipe.

A further object is to provide an automatically operated valve for an overflow pipe of a fluid dispensing pump which is operable to control the fluid only under predetermined conditions of operation of the pipe operating means.

A still further object is to provide a visible pump operable to deliver fluid only under certain conditions whereby only a predetermined amount of fluid can be dispensed.

Other, further and more specific objects will readily appear from the detailed description, claims and drawings appended hereto.

In the drawings, wherein like reference characters are used to designate like parts—

Figure 1 is an elevation of a visible pump, showing the leveling means therefor set in a position to measure a certain amount of fluid but in which position it is impossible to dispense any fluid from the measuring chamber;

Figure 2 is an enlarged fragmentary elevation of a portion of the measuring chamber and standard, showing the leveling means in a position to measure a certain amount of fluid, in which position it is impossible to discharge said fluid;

Figure 3 is an enlarged fragmentary side elevation of the discharge locking means, taken substantially on the plane as indicated by the line 3—3 of Figure 2;

Figure 4 is an enlarged fragmentary elevation, showing the relation of the leveling handle to the dispensing handle locking means when said leveling handle has been withdrawn from measuring position preparatory to resetting said handle to allow discharge of the fluid from the pump;

Figure 5 is an enlarged fragmentary elevation, showing the leveling handle and associated mechanism in position whereby fluid may be discharged from the device;

Figure 6 is an enlarged fragmentary side elevation of the discharge handle control shaft and discharge valve;

Figure 7 is an enlarged fragmentary elevation, showing the valve and valve actuating means for the overflow pipe;

Figure 8 is a plan view of Figure 7, showing the relation of the parts when the valve is in open position; and Figure 9 is a plan view, showing the relation of the parts when the valve is in closed position, said parts corresponding to the position of the parts indicated in Figure 4.

In general, the pump standard or support A has superposed thereon a measuring chamber B provided with an adjustable leveling or overflow pipe C, said pipe being operated by means of a handle D provided at any convenient place in the standard together with leveling supports therefor. The leveling pipe is provided with a control valve E adapted to be opened to allow only a predetermined amount of fluid to be introduced into the measuring chamber. When the overflow valve is in this position, however, it is impossible for the draw-off valve to be opened to allow discharge of the fluid through the pipe F, a locking means G being provided cooperating with the handle D for preventing opening of said draw-off valve.

The arrangement of the parts of the valve is such that when the leveling handle D is rotated the valve E is closed and said leveling handle must be raised to its maximum position before the valve E can be opened, in which position only the valve controlling the overflow pipe may be actuated.

More particularly, the visible pump 10 is provided with a measuring chamber 11 supported on the standard or support 12. In the measuring chamber there may be provided a U-shaped inlet pipe 13 disposed adjacent the adjustable leveling or overflow pipe 14, said pipe 14 being moved by the leveling handle 15 conveniently placed in a suitable aperture 16 in the standard, said aperture being provided with the usual bifurcated level determining fingers 17. The top of the overflow pipe is provided with an overflow cap comprising a lower member 18 and an upper member 19 spaced from each other by any means 20, and it will be understood that these parts may be so arranged and so shaped as to perform substantially the same function as disclosed in application of MacMillen, Serial No. 115,727, filed June 14, 1926; that is, these parts insure an exact measurement of the fluid at all times. The lower member 18 is provided with a valve seat 21 adapted to be closed by the valve disc 22. Said valve disc 22 is provided with a valve stem 23 running through a suitable aperture in the cap 19, and to the top of this valve stem is secured a disc 24 provided for the valve actuation. Between the valve disc and the cap 19 and surrounding the valve stem, there may conveniently be disposed a spring 25 tending to urge the valve disc 22 to closed or seated position. A member 26 is pivoted at 27 to the valve cap 19, said member being provided with an upstanding lug 28 adapted to cooperate with the disc 24 to maintain the valve 22 in open position. This member 26 is provided with a spring 29 tending to urge the member toward the valve stem.

A stop 30 is provided on the valve cap for limiting the movement of the member 26, which member is also provided with a pivoted finger 31, between which finger and the member 26 a spring 32 is provided tending to urge the finger outwardly, the stop 33 being provided on the finger 31 for limiting its outward movement. There is also provided on the cap a standard or bracket 34 to which a member 35 is pivoted, a portion of which is adapted to have contact with the disc 24 and another portion of which is adapted to contact with parts of the member 36, which may conveniently be fastened to one leg of the inlet pipe at a suitable distance above the bottom of the measuring chamber which is just sufficient to allow actuation of the member 35. This position of the member 36 corresponds to the position of the parts shown in Figure 5; that is, where the leveling handle is in its maximum upward position. The member 36 is provided with an outwardly extending finger 37 adapted to cooperate with the member 35, and a cam face 38 for cooperation with the member 31.

Disposed adjacent and in way of the leveling handle 15, there is provided a locking bar 39 pivoted to bellcranks 41 and 41a at 40 and 40a, said bellcranks being pivoted by one arm at 42 and 42a to a bracket 45 and to the standard 12 respectively. A bar 43 is pivoted to the other arm of the bellcranks at 44 and 44a, there being a spring 46 disposed between the bar 43 and a portion of the standard for the purpose of urging the bars 39 and 43 toward the right, as viewed in Figure 2; in other words, toward the leveling fingers 17. The discharge pipe 47 is provided with a suitable valve 52 adapted to be operated by the handle 48 which is fixed to the shaft 49, said shaft being provided with a cam 50 cooperating with the projection 51 of the bar 39, which projection allows or prevents operation of the valve 52 for discharging fluid through a suitable hose adapted to be attached to the nozzle 53.

In the operation of this pump, if a certain amount of fluid is desired to be discharged, it is only necessary to set the leveling handle 15 in the desired finger; for instance, the fifth finger as shown in Figure 2. In this position the leveling cap of the overflow pipe will be in a proper position to allow five units or gallons to be measured in the chamber 11, the valve 22 of said cap being in open position to prevent the introduction of excess fluid through the inlet pipe 13. With the leveling handle in the position indicated in Figure 2, it will be seen that a portion of the bar 39 contacts with this handle, being urged in contact therewith by the spring 46, and the cam 50 controlling the discharge handle is so proportioned that it rests on and abuts the top 51 of the bar 39, and as the handle 48 is adapted for discharge movement upwardly, that is, in a clockwise direction, for opening the valve 52, this handle cannot be operated while the leveling handle is in the position shown. In order then to discharge the fluid, it is necessary to move the handle 15 toward the left free from the fingers 17, which movement will partially rotate the overflow pipe 14 causing the finger 31 to abut a portion of the inlet pipe to cause movement of the member 26 in a counterclockwise direction, freeing the projection 28 from the disc 24 causing the spring 25 to set the valve disc 22 in its seat 21. If then the leveling handle is moved in a downward position due to the fact that the valve disc is in closed position, the fluid level in chamber 11 cannot be affected; thus the amount in the chamber cannot be unauthorizedly diminished.

In order to allow the fluid to be discharged through the discharge pipe 47, it is necessary to raise the leveling handle 15 to its maximum position. Arriving at its maximum position, the member 35 contacts with the finger 37 of the member 36 causing the member 35 to raise the disc 24 thereby opening the valve. When this member is raised, the spring 29 urges the member 26 toward the valve stem causing the projection 28 to again cooperate with the disc 24 to hold said valve in open position. When the leveling handle 15 is rotated into the top measuring finger 17, the finger 31 will not affect the valve 22 due to the fact that it is pivoted to the member 26, so will merely pass the overflow pipe 13, being urged in an inward direction by the spring 32 while passing said pipe. When the leveling handle is in the bifurcation of the top finger 17, the projection 51 of the lever 39 will be free from the cam 50 due to the fact that the bar 39 is cut away at 54 in way of this top finger. It is then possible to operate the handle 48 upwardly, rotating the shaft 49 and opening the valve 52 to empty the fluid from the container 11 through the nozzle 53 and suitable hose connections.

In order to reset the leveling handle 15 to any desired position for the discharge of a predetermined amount of fluid, the handle is moved toward the left and is lowered to a position opposite the leveling finger corresponding to the amount of fluid desired in the leveling chamber. It will be noticed that when the handle 15 is moved toward the left, the valve 22 will not be closed as the finger 31 will come in contact and cooperate with the cam surface 38 which will merely rotate the finger 31 inwardly about its pivot on the member 26 imparting no motion to the member 26, it being understood that when the handle 15 is moved toward the right into engagement with its desired finger, the finger 31 will merely be moved inwardly about its pivot and will in no wise affect the valve 22.

It is to be understood that we do not wish to be limited by the exact embodiment of the device shown as other and various embodiments of parts of the device may readily occur to those skilled in the art.

We claim:

1. In a device of the character described, the combination of a discharge valve for a container, said valve having a locking member cooperating therewith, means for regulating the leveling of fluid in said container, and pivoted means co-operating with said first named means and locking member and having a portion disposed in a predetermined position whereby said second named means disengages said locking member only in said predetermined position to allow operation of said discharge valve.

2. In a device of the character described, the combination of a reservoir, an overflow pipe having a valve therefor, and means controlled by means in said reservoir for opening said valve when the pipe is in a predetermined position to allow discharge of fluid from said device.

3. In a device of the character described, the combination of a reservoir, a movable overflow pipe having a valve therefor, and means for opening said valve when the pipe is in a predetermined position to allow discharge of fluid from said device, said means including means for closing said valve when said pipe is being moved to said predetermined position.

4. In a device of the character described, the combination of a measuring chamber, a slidable and rotatable adjustable valved overflow pipe therein, said valve being within said chamber, operating means for the valve of said pipe actuated by cooperation with separate means by adjustment of said pipe so that said valve is closed when said pipe is being moved to a predetermined position to allow discharge from said device.

5. In a device of the character described, the combination of a slidable and rotatable overflow pipe extending into and leveling fluid in a reservoir, a cap carried by said pipe, said cap having a valve for closing said pipe and means for opening said valve when said pipe is in a predetermined position, and means for closing said valve when said pipe has been rotated to move said pipe to said predetermined position to allow discharge from said reservoir.

6. In a device of the character described, the combination of a slidable and rotatable overflow pipe adapted to adjustably level fluid in a container in said device, a cap for said pipe, a valve for closing said pipe, means on the cap adapted to close said valve when said pipe is rotated to be placed in a predetermined position, and means on said cap adapted to open said valve when said pipe has reached said predetermined position.

7. In a device of the character described, the combination of a slidable and rotatable overflow pipe adapted to adjustably level fluid in a container in said device, a cap for said pipe, a valve for closing said pipe, means on the cap adapted to close said valve by contact with external means when said pipe is rotated to be placed in a predetermined position, and means on said cap adapted to open said valve by contacting other means when said pipe has reached said predetermined position.

8. In a device of the character described, the combination of a slidable and rotatable overflow pipe adapted to adjustably level fluid in a container in said device, a valve for said pipe, control means for said valve comprising a pivoted member adapted to hold said valve in open position, means on said control means for contacting external means to actuate said control means so said valve will close, means cooperating with said valve to move said valve to open position when said last named means contacts a member disposed in predetermined position, and resilient means cooperating with said control means, said valve and said means on said control means tending to move said parts respectively to predetermined positions.

9. In a device of the character described, the combination of an overflow pipe, a cap for said overflow pipe comprising spaced members forming an annular opening to said pipe, a resiliently actuated valve for closing said pipe, means operable to permit said valve to close, said means having resilient means urging said means into open locking position with said valve.

10. In a device of the character described, the combination of an overflow pipe, a cap for said overflow pipe comprising spaced members forming an annular opening to said pipe, a resiliently actuated valve for closing said pipe, means operable to permit said valve to close, said means having resilient means urging said means into open locking position with said valve, and means cooperating with said valve adapted to open said valve to a position where said first named means will lock said valve in open position.

11. In a device of the character described, the combination of a measuring chamber, a discharge valve therefor, overflow means, and means preventing discharge and overflow below a predetermined level until the overflow means is first moved to another predetermined level.

12. In a device of the character described, the combination of a fluid container, a movable overflow pipe therein provided with a movable valve and operating means, a discharge pipe for said container having an operating handle therefor, means interposed between and cooperating with said handle and the overflow pipe operating means whereby said last named means can only be operated when said handle is in a predetermined position, and means cooperating with means in said container for operating said valve whereby said valve is closed when said handle is being moved to said predetermined position and whereby said valve is opened when said handle is at said predetermined position or in a leveling position.

13. In liquid dispensing apparatus the combination of a measuring chamber, discharge means therefrom, leveling means therefor including a slidable and oscillatable overflow pipe having a valve for closing said pipe, means positioned adjacent said pipe, means carried by said pipe for engaging said last named means for moving said valve, and means for locking said valve in predetermined position.

Signed at Rochester, Penna., this 7th day of July, 1927.

LEO DEUTSCH.
GEORGE J. GENUNG.